June 2, 1931.   W. H. CHAPMAN ET AL   1,808,288
WORK HOLDER

Filed April 24, 1925

INVENTORS;
WILLIAM H. CHAPMAN,
PHILLIP H. HUTCHINSON,
BY
THEIR ATTORNEY.

Patented June 2, 1931

1,808,288

UNITED STATES PATENT OFFICE

WILLIAM H. CHAPMAN, OF MONTCLAIR, AND PHILIP H. HUTCHINSON, OF EAST ORANGE, NEW JERSEY, ASSIGNORS TO GENERAL MOTORS CORPORATION, OF DETROIT, MICHIGAN, A CORPORATION OF DELAWARE

WORK HOLDER

Application filed April 24, 1925. Serial No. 25,617.

This invention relates to work holders and comprises all the features of novelty herein disclosed as embodied in a chuck for holding and rotating hollow rings or sleeves as for internal grinding.

An object of the invention is to provide a work holder by which the delay incident to changing work pieces can be largely overcome and by which the operator is relieved of the necessity of supporting the work pieces while securing them in a holder. Another object is to provide a work holder which will more accurately center hollow work pieces and hold them securely during the operation of a tool, such as a grinding wheel.

To these ends and also to improve generally upon devices of the character indicated our invention consists in the various matters hereinafter described and claimed.

Figure 1:
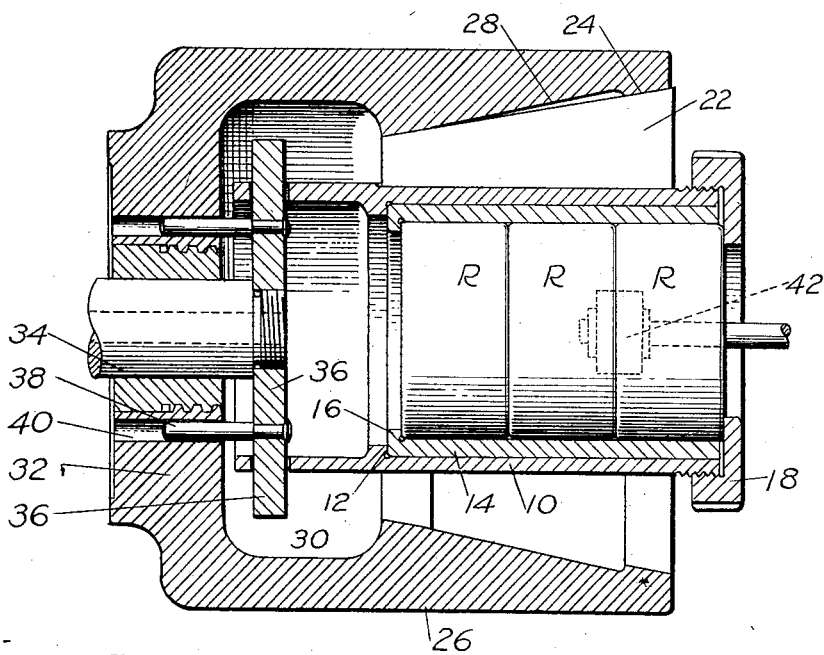
Figure 2:
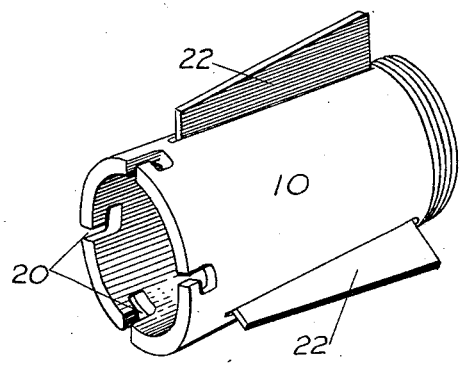

In the drawings, Figure 1 is a longitudinal central section of the work holder and Figure 2 is a perspective view of certain details.

The numeral 10 indicates a sleeve or holder having an annular shoulder 12 which acts as an abutment for a second sleeve 14 slidably and detachably fitting within the first. The sleeve 14 directly supports the work pieces, herein shown as a series of hollow rings or sleeves R, which are clamped against one another and against a flange or abutment 16 on the inner sleeve by an annular nut 18 threaded on the sleeve 10 and abutting the end face of the endmost ring. One end of the sleeve 10 has a series of open-ended or bayonet slots 20 equidistantly arranged for a purpose which will be later referred to. The sleeve is circumferentially continuous to form a rigid holder for the work.

Fixedly secured in slots outside the sleeve 10, as by welding, are a series of spaced centering projections 22, herein shown as wedge shaped, the outermost inclined edges of the projections being arranged for engagement with a cooperating conical face 24 on a recessed rotary head 26. The conical face is preferably relieved as at 28 so that the centering projections engage it only near the ends. The head 26 has an annular chamber 30 and a hub 32 which is centrally bored to guide a slidable clamping rod 34. The hub is attached to the headstock and the rod is actuated longitudinally and locked in any suitable way. Fixed to the end of the rod is a cross bar 36 arranged to enter any two opposite slots 20 in the sleeve 10 when said bar is at its limit of movement to the right.

The sleeve 10 is loaded with rings R while another set of rings is being ground. It is only necessary to slide the loaded sleeve into the mouth of the conical recess and give it a slight rotative movement whereupon the cross bar 36 enters two opposite slots 20 and holds the sleeve against falling out. The operator then actuates the clamping rod 34 to the left to draw the sleeve endwise, the wedge shaped projections 22 centering the work and wedging it firmly in the head. To positively prevent rotary movement of the sleeve with respect to the head during grinding, one or more pins 38 are secured to the cross bar and project into corresponding guide slots 40 in the head. A grinding wheel is indicated in dotted lines at 42 but this is merely representative of any tool for operating on the work. The sleeve can be quickly detached by reversing the described operations and is then replaced by another loaded sleeve. The inner sleeve 14 is detachable from its surrounding sleeve 10 so that it can be replaced by another that fits rings of a different diameter.

Although the invention has been described by reference to a specific construction, it should be understood that, in its broader aspects, it is not necessarily limited to the form selected for mere illustrative purposes.

We claim:

1. In a device of the character described, a rotary head having a centering face, a holder detachable from the head for loading and having means for engaging said centering face, means carried by the holder for clamping a work piece thereon when the holder is detached from the head, means for moving said holder endwise, said means being permanently supported by the head, and a quick detachable connection between said holder and said moving means for allowing removal of the holder from the head while the moving means remains supported by the head; substantially as described.

2. In a device of the character described, a rotary head having a conical face, a sleeve having a plurality of wedge-shaped centering projections to engage said face, a threaded clamping member carried by the sleeve for clamping a work piece on said sleeve, and means for moving said sleeve endwise; substantially as described.

3. In a device of the character described, a rotary head having a conical face, a sleeve having a plurality of wedge-shaped centering projections to engage said face, means carried by the sleeve for clamping a work piece on said sleeve, said sleeve being circumferentially continuous to form a rigid holder for the work piece, means for moving said sleeve endwise, and a detachable connection between said sleeve and the sleeve moving means, said connection being rendered effective or ineffective by a partial rotation of the sleeve; substantially as described.

4. In a device of the character described, a rotary head having a conical face, a sleeve having a plurality of wedge-shaped centering projections to engage said face, means carried solely by the sleeve and operable independently of the head for clamping a work piece on said sleeve, said sleeve having a bayonet slot at one end, a clamping rod, and a bar on the rod for detachable engagement with the slot in the sleeve; substantially as described.

5. In a device of the character described, a rotary head having a recess, a sleeve having a plurality of spaced centering projections to enter said recess, means carried by the sleeve for clamping a work piece on said sleeve, the sleeve being circumferentially continuous to form a rigid holder for the work piece, a clamping rod slidable through the head, and a detachable connection between the sleeve and the rod to allow removal of the sleeve for securing a work piece thereon; substantially as described.

6. In a device of the character described, a rotary head having a conical recess, a sleeve having a plurality of wedge shaped centering projections to engage said recess, means for clamping a work piece on said sleeve, said sleeve having a pair of open ended slots at one end, a clamping rod slidable through the center of the head, and a cross bar on said clamping rod for detachable engagement with the slots in the sleeve; substantially as described.

7. In a device of the character described, a rotary head having a conical recess, a sleeve having a plurality of wedge shaped centering projections to engage said recess, means for clamping a work piece on said sleeve, said sleeve having a pair of open ended slots at one end, a clamping rod slidable through the center of the head, a cross bar on said clamping rod for detachable engagement with the slots in the sleeve, and means for preventing the rotation of the sleeve with respect to the head; substantially as described.

8. In a device of the character described, a rotary head having a conical recess, a sleeve having a plurality of wedge shaped centering projections to engage said recess, means for clamping a work piece on said sleeve, said sleeve having a pair of open ended slots at one end, a clamping rod slidable through the center of the head, a cross bar on said clamping rod for detachable engagement with the slots in the sleeve, and a pin secured to said cross bar and slidable in an opening of the head; substantially as described.

9. In a device of the character described, a rotary head, a hollow work holder removable from the head for loading, means carried by the holder for securing a work piece thereon, the holder being circumferentially continuous to form a rigid support for the work, cooperating inclined faces on said head and work holder, a rod slidable through said head, and a detachable connection between the rod and the work holder; substantially as described.

10. In a device of the character described, a rotary head, a hollow sleeve, a second sleeve detachably supported by the first sleeve and having a cylindrical work engaging surface, said second sleeve having an abutment at one end, a nut threaded on one of said sleeves at the end remote from the abutment for clamping a work-piece against the abutment, and means for securing the first sleeve to the head; substantially as described.

11. In a device of the character described, a hollow sleeve having a shoulder, a second sleeve detachably supported by the first sleeve and having a cylindrical work engaging surface, said second sleeve having a flange at one end, one side of that flange engaging said shoulder and the other side of the flange forming an abutment for the end of a work piece, a nut threaded on the first sleeve for clamping a work piece against the abutment, and means for rotatably supporting the sleeves; substantially as described.

12. In a device of the character described, a rotary head having a centering face, a work holder having means for engaging the centering face on the rotary head, the work holder being detachable from the head for loading and carrying a work clamping member for securing a work-piece on the holder, a clamping rod carried by the rotary head and movable along the axis of the head to secure the work holder to the head, a quick detachable connection between the rod and the holder to allow removal of the holder from the head to receive a work-piece while the clamping rod remains on the head, and means for limiting relative rotation between the holder and the head; substantially as described.

13. In a device of the character described, a rotary head having a recess, a hollow sleeve to enter the recess, a nut threaded on the sleeve to clamp a plurality of rings in axial alignment, means for centering the sleeve in the recess of the head, a clamping rod carried by the rotary head and slidable along the axis of the head to hold the sleeve in the recess, and a detachable connection between the clamping rod and the sleeve to allow removal of the sleeve from the head for loading; substantially as described.

In testimony whereof we hereunto affix our signatures.

WILLIAM H. CHAPMAN.
PHILIP H. HUTCHINSON.